United States Patent [19]

Buckley

[11] Patent Number: 4,614,522

[45] Date of Patent: Sep. 30, 1986

[54] FUEL COMPOSITIONS CONTAINING MODIFIED SUCCINIMIDES (VI)

[75] Inventor: Thomas F. Buckley, Hercules, Calif.

[73] Assignee: Chevron Research Company, San Francisco, Calif.

[21] Appl. No.: 815,329

[22] Filed: Dec. 31, 1985

Related U.S. Application Data

[63] Continuation-in-part of Ser. No. 722,911, Apr. 12, 1985, abandoned.

[51] Int. Cl.$^4$ .............................................. C10L 1/22
[52] U.S. Cl. ......................................... 44/63; 44/71; 44/57; 252/51.5 A
[58] Field of Search ............................... 44/71, 57, 63

[56] References Cited

U.S. PATENT DOCUMENTS 4,104,182  8/1978  Chow et al. .................. 252/32.7 E
4,422,856 12/1983  Maldonado et al. ................... 44/71
4,490,154 12/1984  Sung et al. .............................. 44/70
4,501,597  2/1985  Karol et al. ............................ 44/63
4,521,318  6/1985  Karol ............................. 252/51.5 A

*Primary Examiner*—Jacqueline V. Howard
*Attorney, Agent, or Firm*—S. R. LaPaglia; R. C. Gaffney; G. F. Swiss

[57] ABSTRACT

Disclosed herein are additives which are useful as dispersants and detergents in lubricating oils and fuels. In particular, this invention is directed toward polyamino alkenyl or alkyl succinimides wherein one or more of the amino nitrogens of the succinimide is converted to

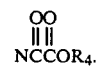

26 Claims, No Drawings

FUEL COMPOSITIONS CONTAINING MODIFIED SUCCINIMIDES (VI)

CROSS REFERENCE TO RELATED APPLICATIONS

This application is a continuation-in-part of U.S. Ser. No. 722,911 filed Apr. 12, 1985 now abandoned.

BACKGROUND OF THE INVENTION

1. Field of the Invention

This invention relates to additives which are useful as dispersant and/or detergents in lubricating oils and fuels. In particular, this invention is directed toward polyamino alkenyl or alkyl succinimides wherein one or more of the nitrogens of the polyamino moiety is substituted with a substituent selected from hydrocarbyloxydicarbonyl, hydroxy hydrocarbyloxydicarbonyl and hydroxy poly(oxyalkylene)dicarbonyl.

The modified polyamino alkenyl or alkyl succinimides of this invention have been found to possess dispersancy and/or detergency properties when employed in a lubricating oil. These modified succinimides are also useful as detergents and/or dispersants in fuels.

2. Prior Art

Alkenyl or alkyl succinimides have been previously modified with alkylene oxides to produce poly(oxyalkylene)hydroxy derivatives thereof. These alkylene oxide treated succinimides are taught as additives for lubricating oils (see U.S. Pat. Nos. 3,373,111 and 3,367,943). U.S. Pat. No. 2,802,022 discloses the reaction of polyamines with ethylene carbonate and derivatives thereof. These products are taught as intermediates in the preparation of polyurethane. U.S. Pat. No. 2,991,162 discloses carburetor detergent additives for gasoline obtained by reacting an N-alkyl propylene diamine with ethylene carbonate to produce a two-component detergent additive consisting of a carbamate and a urea compound. British Pat. No. 689,705 discloses the reaction of an amine or polyamine with ethylene carbonate. U.S. Pat. No. 3,652,240 discloses carburetor detergent additives for hydrocarbonaceous fuel which are carbamates formed by the reaction of an aminoamide with ethylene carbonate. Karol et al, U.S. Pat. Nos. 4,501,597 and 4,460,381, discloses that the reaction product of oxalic acid with a mono- or bis-succinimide is useful as a fuel stabilizer and as a carburetor detergent. U.S. Pat. No. 4,482,464 discloses succinimides which have been modified by treatment with a hydroxyalkylene carboxylic acid selected from glycolic acid, lactic acid, 2-hydroxymethyl propionic acid and 2,2'-bis-hydroxymethylpropionic acid. These modified succinimides of U.S. Pat. No. 4,482,464 are disclosed as lubricating oil additives. U.S. Pat. No. 4,490,154 discloses fuels containing an alkenylsuccinyl polyglycolcarbonate ester as a deposit control additive. U.S. Pat. No. 3,216,936 discloses a product prepared from an aliphatic amine, a polymer substituted succinic acid and an aliphatic monocarboxylic acid. U.S. Pat. No. 4,191,537, among others, discloses hydrocarbyl capped poly(oxyalkylene)polyamino carbamates useful as dispersants and detergents in fuels and lubricating oils. However, there is no teaching in these patents, or apparently elsewhere, to modify these polyamino alkenyl or alkyl succinimides in the manner of this invention.

SUMMARY OF THE INVENTION

It has now been found that polyamino alkenyl or alkyl succinimides may be modified to yield a polyamino alkenyl or alkyl succinimide wherein one or more of the nitrogens of the polyamino moiety is substituted with a hydrocarbyloxydicarbonyl group, a hydroxyhydrocarbyldicarbonyl group or a hydroxy poly(oxyalkylene)dicarbonyl group. Accordingly, the present invention is directed toward a polyamino alkenyl or alkyl succinimide wherein one or more of the nitrogens of the polyamino moiety is substituted with

wherein $R_4$ is selected from the group consisting of hydrocarbyl of from 1 to 30 carbon atoms, $-R_5(OH)_t$ wherein $R_5$ is hydrocarbyl of from 2 to 20 carbon atoms and $t$ is an integer from 1 to 6 with the proviso that there is no hydroxy substitution on the hydrocarbyl carbon atom attaching the $-R_5(OH)_t$ group to the oxy atom of the

moiety and with the further proviso that when $t$ is greater than one, the hydroxy groups are not attached to the same carbon atom and the number of carbon atoms in the $R_5$ group is minimally equal to $t+1$, and $-(R_7O)_sH$ wherein $R_7$ is alkylene of from 2 to 5 carbon atoms and $s$ is an integer from 2 to 100. These modified succinimides are dispersants and/or detergents for use in fuels or oils. Thus, the present invention also relates to a lubricating oil composition comprising a major amount of an oil of lubricating viscosity and an amount of a modified polyamino alkenyl or alkyl succinimide sufficient to provide dispersancy and/or detergency.

Another composition aspect of this invention is a fuel composition comprising a major portion of a hydrocarbon boiling in a gasoline or diesel range and an amount of a modified polyamino alkenyl or alkyl succinimide sufficient to provide dispersancy and/or detergency.

In general, the alkenyl or alkyl group of the succinimide is from 10 to 300 carbon atoms. While the modified succinimides of this invention possess good detergency properties even for alkenyl or alkyl groups of less than 20 carbon atoms, dispersancy is enhanced when the alkenyl or alkyl group is at least 20 carbon atoms. Accordingly, in a preferred embodiment the alkenyl or alkyl group of the succinimide is at least 20 carbon atoms (i.e., the alkenyl or alkyl group is from 20 to 300 carbon atoms).

Polyoxyalkylene, as used above, denotes a polymer containing oxyalkylene of from 2 to 100 units preferably 2 to 30, wherein said oxyalkylene contains from 2 to 5 carbon atoms.

The term "oxydicarbonyl" means the group

Thus, the term "hydrocarbyloxydicarbonyl" means the group

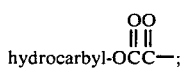

the term "hydroxyhydrocarbyloxydicarbonyl" means the group

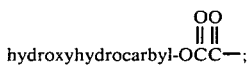

and the term "hydroxy poly(oxyalkylene)dicarbonyl" means the group

wherein s is an integer from 2 to 100.

The substitution of a nitrogen with any of the above-defined groups results in what is conveniently termed an "amide ester" which is understood to mean any of the following:

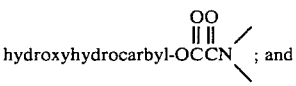

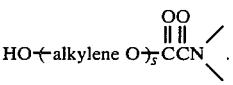

DETAILED DESCRIPTION OF THE INVENTION

The modified polyamino alkenyl or alkyl succinimides of this invention are prepared from a polyamino alkenyl or alkyl succinimide. In turn, these materials are prepared by reacting an alkenyl or alkyl succinic anhydride with a polyamine as shown below:

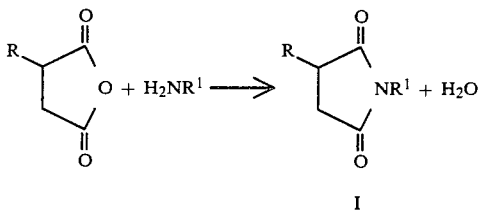

wherein R is an alkenyl or alkyl group of from 10 to 300 carbon atoms; and $R^1$ is the remainder of the polyamino moiety.

These alkenyl or alkyl succinimides that can be used herein are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892; and 3,272,746, the disclosures of which are hereby incorporated by reference. The term "succinimide" is understood in the art to include many of the amide, imide and amidine species which are also formed by this reaction. The predominant product however is succinimide and this term has been generally accepted as meaning the product of a reaction of an alkenyl substituted succinic acid or anhydride with a polyamine as shown above. As used herein, included within this term are the alkenyl or alkyl mono-, bis-succinimides and other higher analogs.

A(1) Succinic Anhydride

The preparation of the alkenyl-substituted succinic anhydride by reaction with a polyolefin and maleic anhydride has been described, e.g., U.S. Pat. Nos. 3,018,250 and 3,024,195. Such methods include the thermal reaction of the polyolefin with maleic anhydride and the reaction of a halogenated polyolefin, such as a chlorinated polyolefin, with maleic anhydride. Reduction of the alkenyl-substituted succinic anhydride yields the corresponding alkyl derivative. Alternatively, the alkenyl substituted succinic anhydride may be prepared as described in U.S. Pat. Nos. 4,388,471 and 4,450,281 which are totally incorporated herein by reference.

Polyolefin polymers for reaction with the maleic anhydride are polymers comprising a major amount of $C_2$ to $C_5$ mono-olefin, e.g., ethylene, propylene, butylene, isobutylene and pentene. The polymers can be homopolymers such as polyisobutylene as well as copolymers of 2 or more such olefins such as copolymers of: ethylene and propylene, butylene, and isobutylene, etc. Other copolymers include those in which a minor amount of the copolymer monomers, e.g., 1 to 20 mole percent is a $C_4$ to $C_8$ nonconjugated diolefin, e.g., a copolymer of isobutylene and butadiene or a copolymer of ethylene, propylene and 1,4-hexadiene, etc.

The polyolefin polymer, represented in I above as R, usually contains from about 10 to 300 carbon atoms, although preferably 20 to 300 carbon atoms. Other preferred embodiments include 12 to 100 carbon atoms and more preferably 20 to 100 carbon atoms.

A particularly preferred class of olefin polymers comprises the polybutenes, which are prepared by polymerization of one or more of 1-butene, 2-butene and isobutene. Especially desirable are polybutenes containing a substantial proportion of units derived from isobutene. The polybutene may contain minor amounts of butadiene which may or may not be incorporated in the polymer. Most often the isobutene units constitute 80%, preferably at least 90%, of the units in the polymer. These polybutenes are readily available commercial materials well known to those skilled in the art. Disclosures thereof will be found, for example, in U.S. Pat. Nos. 3,215,707; 3,231,587; 3,515,669; and 3,579,450, as well as U.S. Pat. No. 3,912,764. The above are incorporated by reference for their disclosures of suitable polybutenes.

In addition to the reaction of a polyolefin with maleic anhydride, many other alkylating hydrocarbons may likewise be used with maleic anhydride to produce alkenyl succinic anhydride. Other suitable alkylating hydrocarbons include cyclic, linear, branched and internal or alpha olefins with molecular weights in the range 100–4,500 or more with molecular weights in the range of 200–2,000 being more preferred. For example, alpha olefins obtained from the thermal cracking or paraffin wax. Generally, these olefins range from 5–20 carbon atoms in length. Another source of alpha olefins is the ethylene growth process which gives even number carbon olefins. Another source of olefins is by the dimerization of alpha olefins over an appropriate catalyst such as the well known Ziegler catalyst. Internal olefins are easily obtained by the isomerization of alpha olefins over a suitable catalyst such as silica.

A(2) Polyamine

The polyamine employed to prepare the polyamino alkenyl or alkyl succinimides is preferably a polyamine having from 2 to about 12 amine nitrogen atoms and from 2 to about 40 carbon atoms. The polyamine is reacted with an alkenyl or alkyl succinic anhydride to produce the polyamino alkenyl or alkyl succinimide, employed in this invention. The polyamine is so selected so as to provide at least one basic amine per succinimide. The polyamine preferably has a carbon-to-nitrogen ratio of from about 1:1 to about 10:1.

Since the reaction to form an amide ester of this invention is believed to efficiently proceed through a primary or secondary amine, at least one of the basic amine nitrogens of the polyamine moiety should be a primary or secondary amine.

The polyamine portion of the polyamino alkenyl or alkyl succinimide may be substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower", as used in terms like lower alkyl or lower alkoxy, means a group containing from 1 to about 6 carbon atoms.

At least one of the substituents on one of the amines of the polyamino moiety is hydrogen, e.g., at least one of the basic nitrogens is a primary or secondary amino nitrogen atom.

Hydrocarbyl, as used in describing the polyamine components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The substituted polyamines of the present invention are generally, but not necessarily, N-substituted polyamines. Exemplary hydrocarbyl groups and substituted hydrocarbyl groups include alkyls such as methyl, ethyl, propyl, butyl, isobutyl, pentyl, hexyl, octyl, etc., alkenyls such as propenyl, isobutenyl, hexenyl, octenyl, etc., hydroxy alkyls, such as 2-hydroxyethyl, 3-hydroxypropyl, hydroxyisopropyl, 4-hydroxybutyl, etc., ketoalkyls, such as 2-ketopropyl, 6-ketooctyl, etc., alkoxy and lower alkenoxy alkyls, such as ethoxyethyl, ethoxypropyl, propoxyethyl, propoxypropyl, 2-(2-ethoxyethoxy)ethyl, 2-(2-(2-ethoxyethoxy)ethoxy)ethyl, 3,6,9,12-tetraoxatetradecyl, 2-(2-ethoxyethoxy)hexyl, etc. The acyl groups of the aforementioned (C) substituents are such as propionyl, acetyl, etc. The more preferred substituents are hydrogen, $C_1$-$C_6$ alkyls, and $C_1$-$C_6$ hydroxyalkyls.

In a substituted polyamine the substituents are found at any atom capable of receiving them. The substituted atoms, e.g., substituted nitrogen atoms, are generally geometrically inequivalent, and consequently the substituted amines finding use in the present invention can be mixtures of mono- and polysubstituted polyamines with substituent groups situated at equivalent and/or inequivalent atoms.

The more preferred polyamine finding use within the scope of the present invention is a polyalkylene polyamine, including alkylene diamine, and including substituted polyamines, e.g., alkyl substituted polyalkylene polyamine. Preferably, the alkylene group contains from 2 to 6 carbon atoms, there being preferably from 2 to 3 carbon atoms between the nitrogen atoms. Such groups are exemplified by ethylene, 1,2-propylene, 2,2-dimethylpropylene, trimethylene, etc. Examples of such polyamines include ethylene diamine, diethylene triamine, di(trimethylene)triamine, dipropylene triamine, triethylene tetramine, tripropylene tetramine, tetraethylene pentamine, and pentaethylene hexamine. Such amines encompass isomers such as branched-chain polyamines and the previously mentioned substituted polyamines, including hydrocarbyl-substituted polyamines. Among the polyalkylene polyamines, those containing 2-12 amine nitrogen atoms and 2-24 carbon atoms are especially preferred, and the $C_2$-$C_5$ alkylene polyamines are most preferred, in particular, the lower polyalkylene polyamines, e.g., ethylene diamine, dipropylene triamine, etc.

The polyamine component also may contain heterocyclic polyamines, heterocyclic substituted amines and substituted heterocyclic compounds, wherein the heterocycle comprises one or more 5-6 membered rings containing oxygen and/or nitrogen. Such heterocycles may be saturated or unsaturated and substituted with groups selected from the aforementioned (A), (B), (C) and (D). The heterocycles are exemplified by piperazines, such as 2-methylpiperazine, 1,2-bis-(N-piperazinyl)ethane, and N,N'-bis(N-piperazinyl)piperazine, 2-methylimidazoline, 3-aminopiperidine, 2-aminopyridine, 2-($\beta$-aminoethyl)-3-pyrroline, 3-aminopyrrolidine, N-(3-aminopropyl)morpholine, etc. Among the heterocyclic compounds, the piperazines are preferred.

Typical polyamines that can be used to form the compounds of this invention include the following: ethylene diamine, 1,2-propylene diamine, 1,3-propylene diamine, diethylene triamine, triethylene tetramine, hexamethylene diamine, tetraethylene pentamine, methylaminopropylene diamine, N-(betaaminoethyl)piperazine, N,N'-di(betaaminoethyl)piperazine, N,N'-di(-beta-aminoethyl)imidazolidone-2, N-(beta-cyanoethyl)-ethane-1,2-diamine, 1,3,6,9-tetraaminooctadecane, 1,3,6-triamino-9-oxadecane, N-(beta-aminoethyl)ethanolamine, N-methyl-1,2-propanediamine, 2-(2-aminoethylamino)-ethanol.

Another group of suitable polyamines are the propyleneamines, (bisaminopropylethylenediamines). Propyleneamines are prepared by the reaction of acrylonitrile with an ethyleneamine, for example, an ethyleneamine having the formula $H_2N(CH_2CH_2NH)_ZH$ wherein Z is an integer from 1 to 5, followed by hydrogenation of the resultant intermediate. Thus, the product prepared from ethylene diamine and acrylonitrile would be $H_2N(CH_2)_3NH(CH_2)_2NH(CH_2)_3NH_2$.

In many instances the polyamine used as a reactant in the production of succinimides of the present invention is not a single compound but a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be largely tetraethylene pentamine and the empirical formula of the total amine composition will closely approximate that of tetraethylene pentamine. Finally, in preparing the succinimide for use in this invention, where the various nitrogen atoms of the polyamine are not geometrically equivalent, several substitutional isomers are possible and are encompassed within the final product. Methods of preparation of polyamines and their reactions are detailed in Sidgewick's "The Organic Chemistry of Nitrogen", Clarendon Press, Oxford, 1966; Noller's "Chemistry of Organic Compounds", Saunders, Philadelphia, 2nd Ed., 1957; and Kirk-Othmer's "Encyclopedia of Chemical Technology", 2nd Ed., especially Volumes 2, pp. 99–116.

The reaction of a polyamine with an alkenyl or alkyl succinic anhydride to produce the polyamino alkenyl or alkyl succinimides is well known in the art and is disclosed in U.S. Pat. Nos. 2,992,708; 3,018,291; 3,024,237; 3,100,673; 3,219,666; 3,172,892 and 3,272,746. The above are incorporated herein by reference for their disclosures of preparing alkenyl or alkyl succinimides.

As noted above, the term "polyamino alkenyl or alkyl succinimide" refers to both polyamino alkenyl or alkyl mono- and bis-succinimides and to the higher analogs of polyamino alkenyl or alkyl poly succinimides. Preparation of the bis- and higher analogs may be accomplished by controlling the molar ratio of the reagents. For example, a product comprising predominantly mono- or bis-succinimide can be prepared by controlling the molar ratios of the polyamine and succinic anhydride. Thus, if one mole of polyamine is reacted with one mole of an alkenyl or alkyl substituted succinic anhydride, a predominantly mono-succinimide product will be prepared. If two moles of an alkenyl or alkyl substituted succinic anhydride are reacted per mole of polyamine, a bis-succinimide is prepared. Higher analogs may likewise be prepared.

A particularly preferred class of polyamino alkenyl or alkyl succinimides employed in the instant invention may be represented by Formula II:

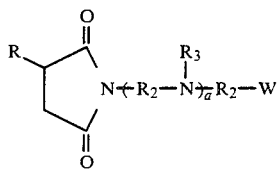　II wherein R is alkenyl or alkyl of from 10 to 300 carbon atoms; $R_2$ is alkylene of 2 to 10 carbon atoms; $R_3$ is hydrogen, lower alkyl or lower hydroxy alkyl; a is an integer from 0 to 10; and W is $-NH_2$ or represents a group of Formula III:

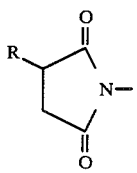　III wherein R is alkenyl or alkyl of from 10 to 300 carbon atoms; with the proviso that when W is the group of Formula III above, then a is not zero and at least one of $R_3$ is hydrogen.

As indicated above, the polyamine employed in preparing the succinimide is often a mixture of different compounds having an average composition indicated as the Formula II. Accordingly, in Formula II each value of $R_2$ and $R_3$ may be the same as or different from other $R_2$ and $R_3$.

Preferably R is alkenyl or alkyl is preferably 20 to 300 carbon atoms. In other preferred embodiments, R is alkenyl or alkyl of from 12 to 100 carbon atoms and more preferably 20 to 100 carbon atoms.

Preferably $R_2$ is alkylene of 2 to 6 carbon atoms and most preferably is either ethylene or propylene.

Preferably, $R_3$ is hydrogen or lower alkyl.

Preferably, a is an integer from 1 to 6.

In formula II, the polyamino alkenyl or alkyl succinimides may be conveniently viewed as being composed of three moieties that is the alkenyl or alkyl moiety R, the succinimide moiety represented by the formula:

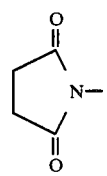

and the polyamino moiety represented by the group

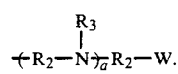

The preferred alkylene polyamines employed in this reaction are generally represented by the formula:

　IV wherein $R_2$ is an alkylene moiety of 2 to 10 carbon atoms and a is an integer from about 0 to 10. However, the preparation of these alkylene polyamines do not produce a single compound and cyclic heterocycles, such as piperazine, may be included to some extent in the alkylene diamines of IV.

B. MODIFIED SUCCINIMIDES

The polyamino alkenyl or alkyl succinimides wherein one or more of the basic ntirogens of the polyamino moiety is converted to a hydrocarbyl amide ester, may be prepared by reaction of a polyamino alkenyl or alkyl succinimide with an appropriate chlorodicarbonyloxy compound.

The polyamino alkenyl or alkyl succinimides wherein one or more of the basic nitrogens of the polyamino moiety is converted to a hydroxyhydrocarbyl amide ester or a hydroxy poly(oxyalkylene) amide ester may be prepared by reaction of a polyamino alkenyl or alkyl succinimide with an appropriate hydroxy protected chlorodicarbonyloxy compound followed by removal of the hydroxy protecting group.

Hydrocarbyl, as used in describing the hydrocarbyloxydicarbonyl-components of this invention, denotes an organic radical composed of carbon and hydrogen which may be aliphatic, aromatic or combinations thereof, e.g., aralkyl. The hydrocarbyl group contains from about 1 to 30 carbon atoms, preferably 2 to 10 carbon atoms and most preferably 2 to 7 carbon atoms. Suitable hydrocarbyls are alkyls such as methyl, ethyl, propyl, butyl, isobutyl, pentyl, hexyl, octyl, etc.; alkenyls such as propenyl, isobutenyl, hexenyl, octenyl, etc.; aralkyl such as benzyl, and the like; aryls such as phenyl, naphthyl, and the like.

Hydroxy hydrocarbyl, as used in describing the hydroxy hydrocarbyloxydicarbonyl components of this invention, denotes an organic radical composed of carbon and hydrogen containing 1 to 6 hydroxy groups, preferably 1 to 3 hydroxy groups, more preferably 1 to 2 hydroxy groups and most preferably 1 hydroxy group. It is also possible that some keto and aldehyde groups may be present in these hydroxy substituted hydrocarbyls altough preferably not. The hydroxy substituted hydrocarbyl group contains from 2 to 20 carbon atoms, preferably 2 to 10 carbon atoms and most preferably 2 to 7 carbon atoms. Suitable hydroxy hydrocarbyls are hydroxy alkyls such as 2-hydroxyethyl, 3-hydroxypropyl, hydroxyisopropyl, 4-hydroxybutyl, 6-hydroxyhexyl, 2,3-dihydroxypropyl and the like. Some hydroxy alkyls may also be termed "hydroxyalkylene" such as 3-hydroxypropylene ($HOCH_2CH_2CH_2-$) and are included within the term hydroxy alkyls defined above. Other suitable hydroxy hydrocarbyls are hydroxy aralkyls such as 3-hydroxy-2-phenylpropyl

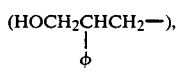

and the like.

Hydroxy poly(oxyalkylene), as used in describing the hydroxy poly(oxyalkylene)dicarbonyl components of this invention, denotes a polymer containing from 2 to 100 $C_2$-$C_5$ oxyalkylene units and may be represented by the formula:

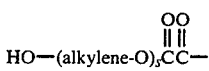

wherein alkylene is a $C_2$-$C_5$ alkylene group and s is an integer from 2 to 100, preferably from about 2 to about 30.

As used herein, the term "molar charge of chlorodicarbonyloxy compound to the basic nitrogen of a polyamino alkenyl or alkyl succinimide" means that the molar charge of chlorodicarbonyloxy compound employed in the reaction is based upon the theoretical number of basic nitrogens contained in the polyamino alkenyl or alkyl succinimide. Thus, when 1 equivalent of triethylene tetraamine (TETA) is reacted with an equivalent of an alkenyl or alkyl succinic anhydride, the resulting monosuccinimide will theoretically contain 3 basic nitrogens. Accordingly, a molar charge of 1 would require that a mole of chlorodicarbonyloxy compound be added for each basic nitrogen or in this case 3 moles of chlorodicarbonyloxy compound for each mole of monosuccinimide prepared from TETA.

Polyamino alkenyl or alkyl succinimides wherein one or more of the nitrogens is substituted with a hydrocarbyloxydicarbonyl group may be prepared as follows:

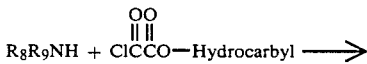

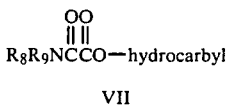

wherein $R_8$ and $R_9$ form the remainder of a polyamino alkenyl or alkyl succinimide and hydrocarbyl is a hydrocarbyl group of from 1 to 30 carbon atoms.

Reaction (1) is conducted by contacting the chlorodicarbonyloxy derivative, V, with the polyamino alkenyl or alkyl succinimide, VI. The reaction may be conducted neat or in a suitable inert diluent. Suitable diluents include ethyl acetate, toluene, xylene, oil and the like. An organic base such as pyridine, triethylamine and the like may be added to the reaction to scavenge the acid generated. However, the generated acid may also be removed by an alkaline water wash or an alkaline brine wash of the reaction solution after reaction completion without the need of added base. The reaction is generally conducted at from 0° C. to 50° C. and is generally complete from within 0.5 to 24 hours. Afterwards, the amide ester, VII, may be further isolated by conventional techniques such as chromatography, filtration and the like.

Polyamino alkenyl or alkyl succinimides wherein one or more of the nitrogens is substituted with a hydroxyhydrocarbyloxydicarbonyl or a hydroxy poly(oxyalkylene)dicarbonyl may be prepared as follows:

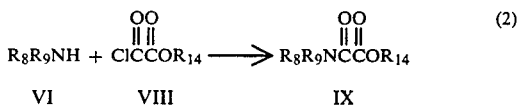

wherein $R_8$ and $R_9$ are as defined above; and $R_{14}$ is either $-R_5(OR_6)_t$ wherein $R_5$ and t are as defined above and $R_6$ is a hydroxy protecting group; or $-(R_7O)_sR_6$ wherein $R_6$, $R_7$ and s are as defined above.

Reaction (2) is conducted by contacting the chlorodicarbonyloxy derivative, VIII, with the polyamino alkenyl or alkyl succinimide, VI. The reaction may be conducted neat or in a suitable inert diluent. Suitable diluents include ethyl acetate, toluene, xylene, oil and the like. An organic base such as pyridine, triethylamine and the like may be added to the reaction to scavenge the acid generated. However, the generated acid is preferably removed by an alkaline water wash (pH of from 8-9) or an alkaline brine wash (pH 8-9) of the reaction solution after reaction completion without the need of added base. The reaction is generally conducted at from −78° C. to 50° C. with 0°-30° C. being preferred. However, when the protecting group employed is trichloroacetate, use of lower temperatures, i.e., −78° C. to 0° C., help prevent possible side products from forming and may be preferred for this purpose. The reaction is generally complete from within 0.5 to 24 hours. If the polyamino moiety of the alkenyl or alkyl succinimide contains hydroxyalkyl substitution, it is preferable to conduct reaction (2) or reaction (1) for that matter at a sufficiently low temperature to prevent reaction of the chlorodicarbonyloxy compound with the hydroxy group resulting in oxydicarbonyloxy formation. Generally, temperatures of from −78° C. to 0° C. are sufficiently low to minimize this oxydicarbonyloxy formation. In any event, any oxydicarbonyloxy so formed from the hydroxyalkyl group during the chlorodicarbonyloxy reaction may itself react with a primary or secondary amino nitrogen of the succinimide to form an amide ester or may be readily removed by posttreating the product with an alkanol (e.g., ethanol) under transesterification conditions.

After the water washing, the product may be further isolated by conventional techniques such as chromatography, filtration and the like or used in reaction (10) without additional isolation.

The hydroxy protecting group, $R_6$, used in chlorodicarbonyloxy, VIII, is any acceptable hydroxy protecting group which does not contain a functionality which is reactive with a chlorodicarbonyloxy compound or an amine of the succinimide under the conditions employed. Suitable protecting groups include benzyl, carbobenzoxy

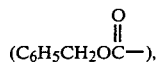
$(C_6H_5CH_2OC-)$, trichloroacetyl

$(CCl_3C-)$ and the like. The identity of the particular protecting group is not critical provided it can be readily removed from the hydroxy group after reaction (2) is completed. For instance, trichloroacetyl may be removed by an alkaline brine wash (pH of from 8–9); by addition of a dialkylamine (e.g., dimethylamine or di-n-butylamine) into the reaction medium; or by an aqueous solution of tetrahydrofuran containing approximately 30% water at a pH 9–10. Removal of the $R_6$ protecting group is conducted at the completion of reaction (2) as shown in reaction (3) below:

 (3)
$R_8R_9NCCOR_5(OR_6)_t$ (or

X

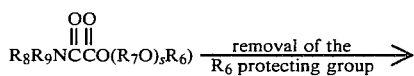
$R_8R_9NCCO(R_7O)_sR_6) \xrightarrow{\text{removal of the } R_6 \text{ protecting group}}$

XI

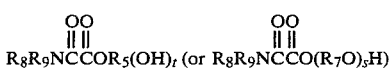
$R_8R_9NCCOR_5(OH)_t$ (or $R_8R_9NCCO(R_7O)_sH$)

XII          XIII wherein $R_8$, $R_9$, $R_5$, $R_6$, $R_7$, s and t are as defined above. Removal of other $R_6$ protecting groups is well known in the art. For example, benzyl and carbobenzoxy protecting groups may be readily removed by hydrogenation using a suitable catalyst such as palladium on carbon. Similarly, carbobenzoxy protecting groups may also be removed by trifluoroacetic acid.

Alternatively, the products of this invention may be prepared by reacting a polyaminoalkenyl or alkyl succinimide, VI, with an aryloxydicarbonyloxy compound as shown in reaction (1a) below:

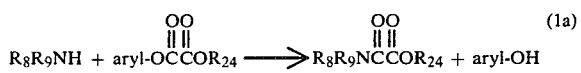 (1a)
$R_8R_9NH + \text{aryl-OCCOR}_{24} \longrightarrow R_8R_9NCCOR_{24} + \text{aryl-OH}$ wherein $R_8$ and $R_9$ are as defined above; $R_{24}$ is hydrocarbyl of from 1 to 30 carbon atoms, $-R_5(OR_6)_t$ wherein $R_5$ and t are as defined above and $R_6$ is a hydroxy protecting group, or $-(R_7O)_sR_6$ wherein $R_6$, $R_7$ and s are as defined above; and aryl is preferably phenyl or substituted phenyl such as p-nitrophenyl, p-chlorophenyl, etc.

Reaction (1a) is conducted by contacting the aryloxydicarbonyloxy compounds with the polyamino alkenyl or alkyl succinimide, VI. The reaction may be conducted neat or in a suitable inert diluent. Suitable diluents include toluene, xylene, thinner, oil, and the like. The reaction is generally conducted at from 50° C. to 150° C. and is generally complete from within 1 to 4 hours. Afterwards, the product may be further isolated by conventional techniques such as stripping, chromatography, filtration, and the like.

The aryloxydicarbonyloxy compounds are prepared via conventional processes from an aryl alcohol and a chlorodicarbonlyloxy compound (V or VIII above), under conditions known per se.

In reactions (1) and (2) above, if additional chlorodicarbonyloxy derivative, V or VIII, is added to the reaction it will efficiently react with any available primary or secondary amine of the polyamino alkenyl or alkyl succinimide and convert these to amide esters. Preferably, it is desirable to convert at least 20% of the primary and secondary amines to amide esters; more preferably at least 50% of the primary and secondary amines should be converted to amide esters; and most preferably all of the primary and secondary amines to amide esters.

In general, maximum amide ester formation in the polyamino alkenyl or alkyl succinimide can be obtained by employing a molar charge of chlorodicarbonyloxy derivative (V or VIII) to the theoretical basic nitrogen of the alkenyl or alkyl succinimide of from 0.7:1 to about 1:1. In some cases, a slight excess of chlorodicarbonyloxy derivative may be employed to enhance reaction rate.

Suitable chlorodicarbonyloxy derivatives, V, include chlorodicarbonyloxy hydrocarbyls wherein hydrocarbyl is a $C_1-C_{30}$ hydrocarbyl group. These chlorodicarbonyloxy hydrocarbyl derivatives may be readily prepared from the corresponding $C_1-C_{30}$ hydrocarbyl alcohols by reaction with oxalyl chloride. The $C_1-C_{30}$ hydrocarbyl alcohols are either commercially available or may be readily prepared by art recognized techniques.

Suitable chlorodicarbonyloxy-hydroxy protected hydrocarbyl of formula VIII (wherein t=1) may be prepared as shown in reactions (4) and (5) below. In these reactions the protecting group $R_6$ is trichloroacetyl although it is understood that other suitable protecting groups may be similarly employed:

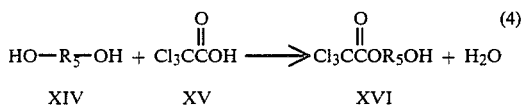 (4)
$HO-R_5-OH + Cl_3CCOH \longrightarrow Cl_3CCOR_5OH + H_2O$

XIV          XV          XVI

-continued

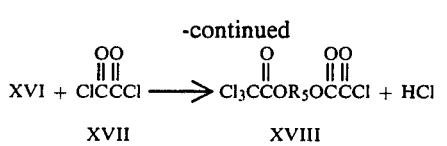

wherein $R_5$ is as defined above.

Reaction (4) is a conventional esterification reaction and is conducted by combining the diol, XIV, with the acid XV, to yield the monester, XVI. In order to prevent formation of a diester, an excess of diol, XIV, is employed. In general, from 1.1 to 4 equivalents of diol, XIV, and preferably 2 equivalents per equivalent of acid XV are employed in reaction (4) although larger excesses may be employed. The reaction may be conducted neat or in a suitable diluent such as toluene, benzene and the like. The water generated during the reaction may be readily removed via a Dean-Stark trap. The product ester, XVI, may be isolated by conventional techniques such as chromatography, filtration and the like or used in reaction (5) without purification.

Alternatively, the monoester, XVI, may be prepared by forming the diester of glycol XIV and then hydrolyzing one of the esters to the alcohol to form monoester XVI.

Reaction (5) is conducted by adding the ester, XVI, to a suitable inert diluent such as toluene, benzene and the like. Oxalyl chloride, XVII, is then added to the system over a period of time. Generally, an excess of oxalyl chloride is employed. In particular, from approximately 1.1-2.5 equivalents of oxalyl chloride is added per equivalent of ester, XVI. The reaction is conducted at from $-78°$ C. to room temperature although preferably at from $-10°$ to $10°$ C. and is generally complete from within $\frac{1}{2}$ to 12 hours. If it is necessary to prevent formation of side products, the ester, XVI, may be slowly added to an excess of oxalyl chloride XVII. The chlorodicarbonyloxy derivative, XVIII, may be isolated by conventional techniques such as distillation but preferably the system is stripped of a portion of the inert diluent which also removes the hydrochloride gas generated and excess oxalyl chloride. The product, XVIII, and the remaining diluent are then used as is in reaction (2) above.

The glycol, XIV, is either commercially available or may be readily prepared from art recognized techniques.

When t is 2 or more, the chlorodicarbonyloxy is prepared similarly as to reactions (4) and (5) above. However, it is noted that excess polyol in these reactions is not necessary since all but one of the hydroxy groups of the polyol should be protected. Accordingly, if the polyol contains 4 hydroxy groups, three of these hydroxy groups should be protected. This can be accomplished by using 3 equivalents of the protecting agent such as trichloroacetic acid. Alternatively, the triester may be prepared by first forming the tetraester and then hydrolyzing one of these esters to a hydroxy group to form the triester. In any case, a mixture is obtained from both procedures and the desired product being isolated by conventional techniques (i.e., chromatography).

Polyols are either commercially available (i.e. glycerol, pentaerythritol, etc.) or may be readily prepared by art recognized techniques.

Chlorodicarbonyloxy poly(oxyalkylene) protected hydroxy are prepared similarly as the chlorodicarbonyloxy hydroxy protected hydrocarbyl by substituting a poly(oxyalkylene)glycol, XIX, in reactions (4) and (5) above.

$$HO(alkyleneO)_sH \qquad XIX$$

wherein alkylene and s are as defined above.

The poly(oxyalkylene)glycol materials, XIX, are the addition polymers of lower aliphatic oxides such as ethylene oxide, propylene oxide, the butylene oxides and the pentylene oxides and are prepared by employing a glycol such as ethylene glycol, propylene glycol and the like under polymerization conditions. These materials are commercially available or may be readily prepared.

For example, in a polymerization reaction a single type of alkylene oxide may be employed, e.g., propylene oxide, in which case the product is a homopolymer, e.g., a hydroxy poly(oxypropylene)propanol. However, copolymers are equally satisfactory and random copolymers are readily prepared by contacting a glycol with a mixture of alkylene oxides, such as a mixture of propylene and butylene oxides. Block copolymers of oxyalkylene units also provide satisfactory poly(oxyalkylene)polymers for the practice of the present invention.

In general, the poly(oxyalkylene)polymers are mixtures of compounds that differ in polymer chain length. However, their properties closely approximate those of the polymer represented by the average composition and molecular weight.

If the polyamino moiety of the alkenyl or alkyl succinimide does not contain hydroxy alkyl substitution, hydroxy alkyl groups may be introduced into the modified succinimides of this invention by addition of a chloroalkanol (e.g., chloroethanol) provided the succinimide retains some basic nitrogen. The chloroalkanol will react with basic nitrogen to yield the hydroxy alkyl group. This reaction may also produce some quaterinized nitrogen products but this may be minimized by controlling the reaction conditions such as by limiting the amount of chloroalkanol added.

Accordingly, by employing the appropriate chlorodicarbonyloxy reagent and a polyamino alkenyl or alkyl succinimide of formula II above in the above reactions, compounds of the following formula are produced.

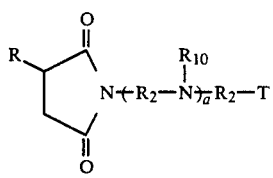

wherein R is alkenyl or alkyl of from 10 to 300 carbon atoms; $R_2$ is alkylene of from 2 to 10 carbon atoms; a is an integer from 0 to 10; $R_{10}$ is hydrogen, lower alkyl of from 1 to 6 carbon atoms, lower hydroxy alkyl of from 1 to 6 carbon atoms, and

wherein $R_4$ is selected from the group consisting of hydrocarbyl of from 1 to 30 carbon atoms, $-R_5(OH)_t$ wherein $R_5$ is hydrocarbyl of from 2 to 20 carbon atoms and t is an integer from 1 to 6 with the proviso that there is no hydroxy substitution on the hydrocarbyl carbon atom attaching the —R$_5$(OH)$_t$ group to the oxy atom of the

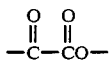

moiety and with the further proviso that when t is greater than one, the hydroxy groups are not attached to the same carbon atom and the number of carbon atoms in the R$_5$ group is minimally equal to t+1, and —(R$_7$O)$_s$H wherein R$_7$ is alkylene of from 2 to 5 carbon atoms and s is an integer from 2 to 100; T is

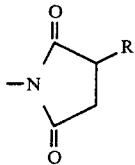

or —NHR$_{10}$ wherein R and R$_{10}$ are as above defined with the proviso that at least one of R$_{10}$ is

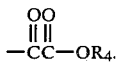

Preferably R is alkenyl or alkyl of from about 20 to 300 carbon atoms, and more preferably 20 to 100 carbon atoms; R$_2$ is alkylene of from 2 to 6 carbon atoms; a is an integer from 1 to 6; R$_{10}$ is

Preferably s is an integer from 2 to 30 and most preferably 2 to 20.

A carbon atom containing 2 hydroxy groups are hemiketals which readily lose water to form ketones (or aldehydes). For the purpose of this invention, if t is 2 or more than the hydroxy groups are not on the same carbon atom. Moreover, the carbon atom attached to the oxy atom of the dicarbonyloxy group cannot be substituted with hydroxy since such hydroxy substitution would require that the alcohol XIV (or its equivalent if t is greater than 1) be a hemiketal which is not within the scope of this invention. Accordingly, for each value of t greater than 1, the number of carbon atoms in the hydrocarbyl group must minimally equal t+1.

The modified succinimides of this invention can be reacted at a temperature sufficient to cause reaction with boric acid or a similar boron compound to form borated dispersants having utility within the scope of this invention. In addition to boric acid (boron acid), examples of suitable boron compounds include boron oxides, boron halides and esters of boric acid. Generally from about 0.1 equivalents to 10 equivalents of boron compound to the modified succinimide may be employed.

The modified polyamino alkenyl or alkyl succinimides of this invention are useful as detergent and dispersant additives when employed in lubricating oils. When employed in this manner, the modified polyamino alkenyl or alkyl succinimide additive is usually present in from 0.2 to 10 percent by weight to the total composition and preferably at about 0.5 to 5 percent by weight. The lubricating oil used with the additive compositions of this invention may be mineral oil or synthetic oils of lubricating viscosity and preferably suitable for use in the crankcase of an internal combustion engine. Crankcase lubricating oils ordinarily have a viscosity of about 1300 CSt 0° F. to 22.7 CSt at 210° F. (99° C.). The lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of C$_6$ to C$_{12}$ alpha olefins such as 1-decene trimer. Likewise, alkyl benzenes of proper viscosity such as didodecyl benzene, can be used. Useful synthetic esters include the esters of both monocarboxylic acid and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used.

Blends of hydrocarbon oils with synthetic oils are also useful. For example, blends of 10 to 25 weight percent hydrogenated 1-decene trimer with 75 to 90 weight percent 150 SUS (100° F.) mineral oil gives an excellent lubricating oil base.

Additive concentrates are also included within the scope of this invention. The concentrates of this invention usually include from about 90 to 10 weight percent of an oil of lubricating viscosity and from about 10 to 90 weight percent of the complex additive of this invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 35 to about 500 Saybolt Universal Seconds (SUS) at 100° F. (38° C.), although an oil of lubricating viscosity may be used.

Other additives which may be present in the formulation include rust inhibitors, foam inhibitors, corrosion inhibitors, metal deactivators, pour point depressants, antioxidants, and a variety of other well-known additives.

It is also contemplated the modified succinimides of this invention may be employed as dispersants and detergents in hydraulic fluids, marine crankcase lubricants and the like. When so employed, the modified succinimide is added at from about 0.1 to 10 percent by weight to the oil. Preferably, at from 0.5 to 5 weight percent.

When used in fuels, the proper concentration of the additive necessary in order to achieve the desired detergency is dependent upon a variety of factors including the type of fuel used, the presence of other detergents or dispersants or other additives, etc. Generally, however, and in the preferred embodiment, the range of concentration of the additive in the base fuel is 10 to 10,000 weight parts per million, preferably from 30 to 2,000 weight parts per million, and most preferably from 30 to 700 parts per million of the modified succinimide per part of base fuel. If other detergents are present, a lesser amount of the modified succinimide may be used.

The modified succinimide additives of this invention may be formulated as a fuel concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. In the fuel concentrate, the amount of the additive will be ordinarily at least 10 percent by weight and generally not exceed 70 percent by weight and preferably from 10 to 25 weight percent.

The following examples are offered to specifically illustrate this invention. These examples and illustrations are not to be construed in any way as limiting the scope of this invention.

EXAMPLES

Example 1

Preparation of Ethylene Glycol Mono-Trichloroacetate

To a 3-neck flask equipped with a nitrogen inlet tube, a mechanical stirrer and a dean stark trap was added 37.2 g of ethylene glycol (0.6 moles) and 49.0 g of trichloroacetic acid (0.3 moles). The mixture was heated at 150° C. for 3.5 hours. Volatiles distills out of the reaction mixture and are collected in the Dean-Stark trap. After cooling, the crude mixture was dissolved in 150 ml of methylene chloride and was washed three times with 150 ml of ice water. The organic phase was dried over anhydrous sodium sulfate, filtered and the solvent was removed under vacuum to give the mono-trichloroacetate as the major product.

A sample of mono-trichloroacetate prepared similarly as above was purified by silica gel chromatography. The crude material (90.8 g) was placed on a column packed with 484 g of silica gel and eluted with 5% ethyl acetate/hexane. The mono-trichloroacetate has an $R_f=0.25$ in this solvent system and 58.2 g was obtained as single spot material.

Example 2

Preparation of Chlorodicarbonyloxy derivative of Ethylene Glycol Mono-Trichloroacetate Ethylene glycol mono-trichloroacetate, 14.5 g, 0.07 moles, is dissolved in 100 ml of toluene and excess oxalyl chloride carefully passed through the solution for several hours. The reaction is monitored by TLC until all of the starting material is gone. After the reaction is completed, nitrogen is bubbled through the solution to remove hydrogen chloride and unreacted oxalyl chloride. The toluene solution containing the chlorodicarbonyloxy derivative of ethylene glycol can be used in subsequent reactions.

Example 3

Preparation of a Hydroxy Ethyl Amide Ester of a Polyamino Alkenyl or Alkyl Succinimide. Reaction of Protected Chlorodicarbonyloxy Derivative with Bissuccinimide (a) The chlorodicarbonyloxy derivative of ethylene glycol mono-trichloroacetate, 4.3 g (0.0144 moles) is dissolved in 20 ml toluene. 20.3 g of a bissuccinimide dispersant composition (prepared by reacting 1 mole of polyisobutenyl succinic anhydride, where the polyisobutenyl group has a number average molecular weight (MW) of about 950, with 0.5 mole of tetraethylene pentaamine then diluting to about 50% actives in diluent oil to give a material with an AV=29.7 and a nitrogen content of 1.51%) is dissolved in 25 ml of toluene. Both solutions are cooled to below 0° C. (approximately $-2°$ C.) using a salt ice-water bath. The solutions are poured together into a 500 ml flask equipped with a mechanical stirrer and drying tube attached. The reaction solution is mixed with strong stirring and kept below 0° C. for 40 minutes and then allowed to warm to room temperature.

(b) After stirring at room temperature for several hours, the reaction solution is added to 130 mls hexane and 65 mls in NaOH in a separatory funnel in order to remove the trichloroacetate group. The mixture is intermittantly shaken for 30 minutes. After phase separation, the organic layer is washed several times with brine, dried over anhydrous magnesium sulfate, filtered and stripped to yield the title product.

Example 4

Preparation of Glycerol Di-(trichloroacetate)

To a 3-neck flask equipped with a nitrogen inlet tube, a mechanical stirrer and a Dean-Stark trap is added 92 g of glycerol and 326.8 g of trichloroacetic acid. The mixture is heated at 150° C. for 3.5 hours. Water distills out of the reaction mixture and is collected in the Dean-Stark trap. After cooling, the crude mixture is dissolved in 150 ml of methylene chloride and is washed three times with 150 ml of ice water. The organic phase is dried over anhydrous sodium sulfate, filtered and the solvent is removed under vacuum to give a di(trichloroacetate) of glycerol which may be purified by column chromatography using silica gel.

Example 5

Preparation of Chlorodicarbonyloxy Derivative of Glycerol Di-(trichloroacetate)

Glycerol di-(trichloroacetate) 36.1 g, is dissolved in 200 ml of toluene and excess oxalyl chloride is carefully passed through the solution for several hours. The reaction is monitored by TLC until all of the starting material is gone. After reaction completion, nitrogen is bubbled through the solution to remove hydrogen chloride and unreacted oxalyl chloride to yield a toluene solution containing the title product.

Example 6

The chlorodicarbonyloxy derivative of glycerol-di(-trichloroacetate), 42.3 g, is dissolved in 200 ml toluene. 300 g of a monosuccinimide dispersant composition (prepared by reacting 1 mole of polyisobutenyl succinic anhydride, where the polyisobutenyl group has a number average molecular weight of about 950, with 0.87 mole of tetraethylene pentaamine then diluting to about 50% actives in diluent oil) is dissolved in 200 ml toluene. Both solutions are cooled to below 0° C. (approximately $-2°$ C.) using a salt ince-water bath. The solutions are poured together into a 2 l flask equipped with a mechanical stirrer and a drying tube. The reaction solution is mixed with strong stirring and kept below 0° C. for 40 minutes and then is allowed to warm to room temperature. After stirring at room temperature for several hours, about 65 mls of the reaction mixture is added to 130 mls hexane and 65 mls 1N NaOH in a separatory funnel in order to remove the trichloroacetate group. The mixture is intermittantly shaked for 30 minutes. After phase separation, the organic layer is washed several times with brine, is dried over anhydrous magnesium sulfate, is filtered and stripped to yield dihydroxypropyl amide ester derivatives of the monosuccinimide.

Example 7

To a 3-neck flask equpped with a nitrogen inlet tube, a mechanical stirrer and a Dean-Stark trap is added 36 g of polyethylene glycol (average MW=600— available from Aldrich Chemical Co., Milwaukee, Wis. as Aldrich 20,240-1) and 4.9 g of trichloroacetic acid. The mixture is heated at 150° C. for 3.5 hours. Water distills out of the reaction mixture and is collected in the Dean-Stark trap. After cooling, the crude mixture is dissolved in 150 ml of methylene chloride and is washed three times with 150 ml of ice-water. The organic phase is dried over anhydrous sodium sulfate, filtered and the solvent is removed to give polyethylene glycol monotrichloroacetate which is purified by column chromatography using silica gel.

By following the procedures outlined in Examples 1–6 above, the chlorodicarbonyloxy derivative of the polyethylene glycol monotrichloroacetate is prepared which then is reacted with a succinimide of this invention and then is then deprotected to yield a succinimide wherein one or more of the basic nitrogens has been converted to a hydroxy polyoxyethylene amide ester.

Example 8

To a 5-liter, 3-necked flask is charged, 1,250 g of the monosuccinimide dispersant composition of Example 6. Afterwards, 1,440 g of eicosyl chlorodicarbonyloxy compound (prepared by reacting 1-eicosanol with oxalyl chloride) is slowly added to the reaction system at a temperature from 20°-25° C. The reaction system is stirred at this temperature for 3 hours at which time the reaction solution is added to 250 hydrocarbon thinner which is a mixture of aromatics, paraffins and naphthenes. The organic solution is washed with brine and then stripped to remove volatiles to yield a dispersant product containing eicosyl amide ester functionalities.

Similarly prepare other hydrocarbyl amide esters by employing methanol, ethanol, isopropanol, decanol and the like in place of 1-eicosanol in the above example to yield dispersant products useful in this invention.

What is claimed is:

1. A fuel composition comprising a hydrocarbon boiling in the gasoline or diesel range and from 10 to 10,000 parts per million of a polyamino alkenyl or alkyl succinimide wherein one or more of the nitrogens of the polyamino moiety is substituted with

wherein $R_4$ is selected from the group consisting of hydrocarbyl of from 1 to 30 carbon atoms, $-R_5(OH)_t$ wherein $R_5$ is hydrocarbyl of from 2 to 20 carbon atoms and t is an integer from 1 to 6 with the proviso that there is no hydroxy substitution on the hydrocarbyl carbon atom attaching the $-R_5(OH)_t$ group to the oxy atom of the

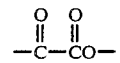

moiety and with the further proviso than when t is greater than one, the hydroxy groups are not attached to the same carbon atom and the number of carbon atoms in the $R_5$ group is minimally equal to t+1, and $-(R_7O)_sH$ wherein $R_7$ is alkylene of from 2 to 5 carbon atoms and s is an integer from 2 to 100.

2. The fuel composition defined in claim 1 wherein $R_4$ is hydrocarbyl of from 1 to 30 carbon atoms.

3. The fuel composition defined in claim 2 wherein $R_4$ is hydrocarbyl of from 2 to 10 carbon atoms.

4. The fuel composition defined in claim 3 wherein $R_4$ is hydrocarbyl of from 2 to 7 carbon atoms.

5. The fuel composition defined in claim 1 wherein $R_4$ is $-R_5(OH)_t$ wherein $R_5$ is hydrocarbyl of from 2 to 20 carbon atoms and t is an integer from 1 to 6 with the proviso that there is no hydroxy substitution on the hydrocarbyl carbon atom attaching the $-R_5(OH)_t$ group to the oxy atom of the

moiety and with the further proviso that when t is greater than one, the hydroxy groups are not attached to the same carbon atom and the number of carbon atoms in the $R_5$ group is minimally equal to t+1.

6. The fuel composition defined in claim 5 wherein $R_5$ is hydrocarbyl of from 2 to 10 carbon atoms.

7. The fuel composition defined in claim 6 wherein t is 1.

8. The fuel composition defined in claim 5 where $-R_5(OH)_t$ is hydroxyethylene ($-CH_2CH_2OH$).

9. The fuel composition of claim 1 wherein $R_4$ is $-(R_7O)_sH$ wherein $R_7$ is alkylene of from 2 to 5 carbon atoms and s is an integer of from 2 to 100.

10. The fuel composition defined in claim 9 wherein s is an integer from 2 to 30.

11. The fuel composition defined in claim 10 wherein s is an integer from 2 to 20.

12. A fuel composition comprising a hydrocarbon boiling in the gasoline or diesel range and from 10 to 10,000 parts per million of a compound of the formula

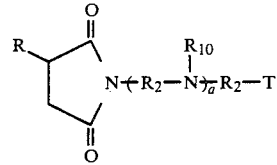

wherein R is alkenyl or alkyl of from 10 to 300 carbon atoms; $R_2$ is alkylene of from 2 to 10 carbon atoms; a is an integer from 1 to 6; $R_{10}$ is hydrogen, lower alkyl of from 1 to 6 carbon atoms, lower hydroxy alkyl of 1 to 6 carbon atoms, and

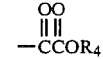

wherein R₄ is selected from the group consisting of hydrocarbyl of from 1 to 30 carbon atoms, —R₅(OH)$_t$ wherein R₅ is hydrocarbyl of from 2 to 20 carbon atoms and t is an integer from 1 to 6 with the proviso that there is no hydroxy substitution on the hydrocarbyl carbon atom attaching the —R₅(OH)$_t$ group to the oxy atom of the

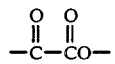

moiety and with the further proviso that when t is greater than one, the hydroxy groups are not attached to the same carbon atom and the number of carbon atoms in the R₅ group is minimally equal to t+1, and —(R₇O)$_s$H wherein R₇ is alkylene of 2 to 5 carbon atoms and s is an integer from 2 to 100; and T is

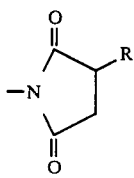

or —NHR₁₀ wherein R and R₁₀ are as defined above with the proviso that at least one of R₁₀ is

13. The fuel composition defined in claim 5 wherein R is alkenyl or alkyl of from 20 to 300 carbon atoms.

14. The fuel composition defined in claim 13 wherein R is alkenyl or alkyl of from 20 to 100 carbon atoms.

15. The fuel composition defined in claim 14 wherein R₄ is hydrocarbyl of from 1 to 30 carbon atoms.

16. The fuel composition defined in claim 15 wherein R₄ is hydrocarbyl of from 2 to 10 carbon atoms.

17. The fuel composition defined in claim 14 wherein R₄ is hydrocarbyl of from 2 to 7 carbon atoms.

18. The fuel composition defined in claim 14 wherein R₄ is —R₅(OH)$_t$ wherein R₅ is hydrocarbyl of from 2 to 20 carbon atoms and t is an integer from 1 to 6 with the proviso that there is no hydroxy substitution on the hydrocarbyl carbon atom attaching the —R₅(OH)$_t$ group to the oxy atom of the

moiety and with the further proviso that when t is greater than one, the hydroxy groups are not attached to the same carbon atom and the number of carbon atoms in the R₅ group is minimally equal to t+1.

19. The fuel composition defined in claim 18 wherein R₅ is hydrocarbyl of from 2 to 10 carbon atoms.

20. The fuel composition defined in claim 19 wherein t is 1.

21. The fuel composition defined in claim 18 wherein —R₅(OH)$_t$ is hydroxyethylene (e.g., —CH₂CH₂OH).

22. The fuel composition defined in claim 14 wherein R₄ is —(R₇O)$_s$H wherein R₇ is alkylene of from 2 to 5 carbon atoms and s is an integer of from 2 to 100.

23. The fuel composition defined in claim 22 wherein s is an integer of from 2 to 30.

24. The fuel composition defined in claim 23 wherein s is an integer of from 2 to 20.

25. A fuel concentrate comprising 30 to 90 weight percent of a inert oleophilic organic solvent and 10 to 70 weight percent of a polyamino alkenyl or alkyl succinimide wherein one or more of the nitrogens of the polyamino moiety is substituted with

wherein R₄ is selected from the group consisting of hydrocarbyl of from 1 to 30 carbon atoms, —R₅(OH)$_t$ wherein R₅ is hydrocarbyl of from 2 to 20 carbon atoms and t is an integer from 1 to 6 with the proviso that there is no hydroxy substitution on the hydrocarbyl carbon atom attaching the —R₅(OH)$_t$ group to the oxy atom of the

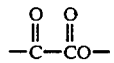

moiety and with the further proviso than when t is greater than one, the hydroxy groups are not attached to the same carbon atom and the number of carbon atoms in the R₅ group is minimally equal to t+1, and —(R₇O)$_s$H wherein R₇ is alkylene of from 2 to 5 carbon atoms and s is an integer from 2 to 100.

26. A fuel concentrate comprising 70 to 10 weight percent of an inert oleophilic organic solvent and 10 to 70 weight percent of a compound of the formula

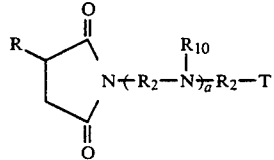

wherein R is alkenyl or alkyl of from 10 to 300 carbon atoms; R₂ is alkylene of from 2 to 10 carbon atoms; a is an integer from 0 to 10; R₁₀ is hydrogen, lower alkyl of from 1 to 6 carbon atoms, lower hydroxy alkyl of 1 to 6 carbon atoms, and

wherein R₄ is selected from the group consisting of hydrocarbyl of from 1 to 30 carbon atoms, —R₅(OH)$_t$ wherein R₅ is hydrocarbyl of from 2 to 20 carbon atoms and t is an integer from 1 to 6 with the proviso that there is no hydroxy substitution on the hydrocarbyl carbon atom attaching the —R₅(OH)$_t$ group to the oxy atom of the

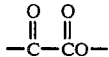

moiety and with the further proviso that when t is greater than one, the hydroxy groups are not attached to the same carbon atom and the number of carbon atoms in the $R_5$ group is minimally equal to $t+1$, and
—$(R_7O)_sH$ wherein $R_7$ is alkylene of 2 to 5 carbon atoms and s is an integer from 2 to 100; and T is
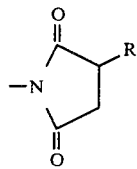
or —$NHR_{10}$ wherein R and $R_{10}$ are as defined above with the proviso that at least one of $R_{10}$ is
* * * * *